United States Patent [19]

Guimbretiere

[11] Patent Number: 5,310,382

[45] Date of Patent: May 10, 1994

[54] TRANSMISSION DEVICE WITH A CONTROLLED VISCOUS COUPLER, IN PARTICULAR FOR A MOTOR VEHICLE

[75] Inventor: Pierre Guimbretiere, Neauphle le Chateau, France

[73] Assignee: Glaenzer Spicer, Poissy, France

[21] Appl. No.: 872,448

[22] Filed: Apr. 23, 1992

[30] Foreign Application Priority Data

Apr. 26, 1991 [FR] France ................. 91 05202

[51] Int. Cl.5 .................. F16D 3/10; F16D 25/00
[52] U.S. Cl. ............................ 464/1; 464/2; 464/3; 464/24; 192/58 C; 192/103 R; 192/93 A; 475/231
[58] Field of Search ................ 464/1, 2, 3, 4, 24, 464/28, 45; 192/58 C, 103 A, 93 A; 475/231, 232

[56] References Cited

U.S. PATENT DOCUMENTS

| 2,387,195 | 10/1945 | Tjaarda | 464/3 |
|---|---|---|---|
| 2,684,743 | 7/1954 | Trofimov . | |
| 2,714,946 | 8/1955 | Tenot . | |
| 4,757,727 | 7/1988 | Teraoka et al. | 192/93 A |
| 4,856,637 | 8/1989 | Gebhart | 192/103 A |
| 5,165,506 | 11/1992 | Guimbretiere | 192/58 C |

FOREIGN PATENT DOCUMENTS

| 0011908 | 6/1980 | European Pat. Off. | 192/103 A |
|---|---|---|---|
| 0157236 | 3/1985 | European Pat. Off. . | |
| 0391722 | 4/1990 | European Pat. Off. . | |
| 0414086 | 8/1990 | European Pat. Off. | 475/231 |
| 0479639 | 4/1992 | European Pat. Off. . | |
| 1288361 | 1/1969 | Fed. Rep. of Germany . | |
| 3447911 | 10/1985 | Fed. Rep. of Germany . | |
| 3918822 | 3/1990 | Fed. Rep. of Germany . | |
| 57-204348 | 12/1982 | Japan . | |
| 2135424 | 9/1983 | United Kingdom . | |

Primary Examiner—Clifford D. Crowder
Assistant Examiner—Bibhu Mohanty
Attorney, Agent, or Firm—Harness, Dickey & Pierce

[57] ABSTRACT

The invention relates to a transmission device between two coaxial rotating members (1; 10), of the type comprising a viscous-fluid coupling (11) with a driving element and a driven element, and control devices for modifying the operating characteristic of this coupling. It is defined, in particular, in that the control devices are incorporated into the transmission device and act as a function of the rotational speed of one the said members and as a function of a torque transmitted by the device. The control devices can comprise flyweights (21) which are rotationally integral with the member (1) and with the case (12) of the viscous-fluid coupling, these flyweights acting to modify the internal pressure in the coupling (11), via shuttles (27) and a sliding sleeve (8) which is displaced as a function of the torque transmitted between the sun gear (2) and the output shaft (10). This sliding sleeve can, for example, act on a plate (16) which modifies the spacing between the disks (14, 15) of the coupling. Application, in particular, to four-wheel drive vehicles.

27 Claims, 5 Drawing Sheets

TRANSMISSION DEVICE WITH A CONTROLLED VISCOUS COUPLER, IN PARTICULAR FOR A MOTOR VEHICLE

The present invention relates to transmission devices, in particular for motor vehicles, and to be more precise such devices comprising a viscous-fluid coupling which is generally referred to by the terms viscous coupler or viscous transmitter.

These viscous couplers or viscous transmitters are of the type comprising an internal element and an external element which rotate, are coaxial and define between them an enclosure containing a viscous fluid, each element being rotationally integral with a series of disks, the disks of the two series alternating and being immersed at least partially in the viscous fluid. One of the elements is driving and the other element is driven from the first through the effect of the load torque caused by the shearing of the viscous fluid by the disks. This load torque C varies as a function of the difference in speed $\Delta n$ between the two internal and external elements, $C = f(\Delta n)$.

Attempts have already been made to modify the operating characteristic $C = f(\Delta n)$ of such a coupling, for example by bringing the torque transmitted by the device into action. However, taking just this torque parameter into consideration can be insufficient, for example when the low-speed maneuvers of the vehicle are to be facilitated, during parking maneuvers, or alternatively when such a transmission is combined with anti-skid and/or anti-overspeeding systems for the wheels. The term anti-skidding refers to the situation in which the wheels can lock when braking and skid relative to the ground. The term anti-overspeeding, on the other hand, refers to the situation where the wheels can skid when moving off under the effect of an excessive torque for the friction characteristics of the ground.

The object of this invention is to provide a device which enables this problem to be overcome and the operating characteristic of the viscous-fluid coupling to be varied in the most effective and advantageous manner.

To this end, the subject of the invention is a transmission device between two coaxial rotating members, comprising a viscous-fluid coupling and control means for modifying the operating characteristic of this coupling, wherein said control means are incorporated into the device and act as a function of the rotational speed of one of the said members and as a function of a torque transmitted by the device.

According to other features:
- the modification of the operating characteristic of the coupling takes place firstly as a function of said rotational speed;
- the modification of the operating characteristic of the coupling takes place firstly as a function of said torque;
- the speed taken into consideration is that of the driving element of the coupling device;
- the speed taken into consideration is that of the driven element of the coupling device;
- it comprises means preventing one of the two parameters, speed and torque, from being taken into consideration as long as the other parameter has not reached a predetermined threshold value;
- the two rotating members are two of the input and output members of a differential, the speed taken into consideration being that of one of these two members, whilst the torque taken into consideration is that which passes between one of said members and the coupling;
- it is interposed between two coaxial shaft sections.

The invention will be described in more detail below with reference to the attached drawings, which are given purely by way of examples and in which.

Figure 1:
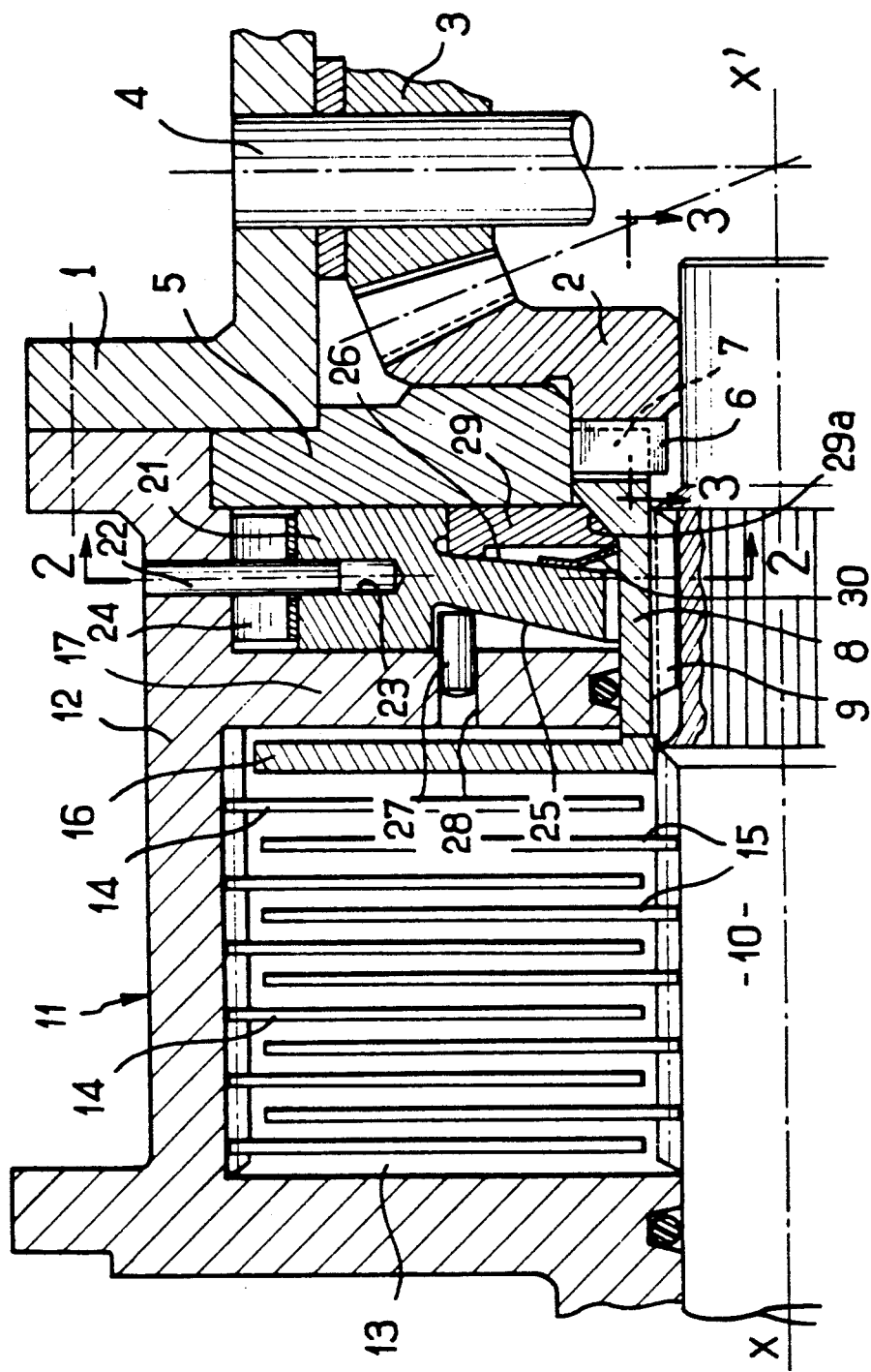
FIG. 1 is a partial sectional view of a transmission device according to the invention.

Part of a motor-vehicle differential has been illustrated in FIG. 1, which differential comprises a case 1, sun gears 2, only one of which can be seen in the drawing, and planet gears such as that designated by the reference 3, which are carried by a planet-gear-carrying spindle 4.

The sun gear 2 bears against a wall 5 of the case and comprises, in its rear part, at least one inclined plane 6 interacting with at least one complementary inclined plane 7 carried by a sleeve 8 connected by splines 9 to an output shaft 10 of axis X—X.

Figure 3:
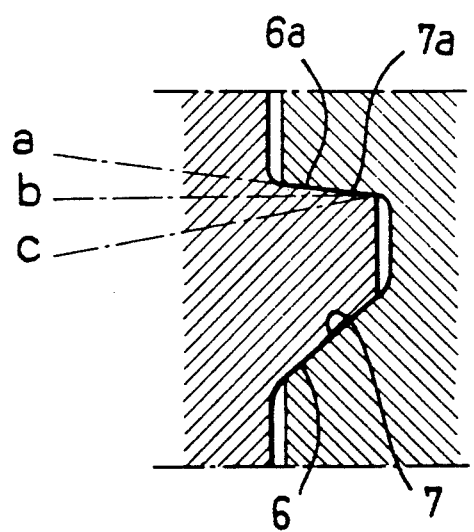
FIG. 3 is a sectional view along the line 3—3 in FIG. 1.

The shape of these inclined planes can be seen more clearly in FIG. 3.

A first set of inclined planes 6, 7 comes into play when the coupling device must transmit a driving torque, whilst the second set $6^a$, $7^a$ is stressed when the device transmits a braking torque.

As illustrated respectively in solid lines and in dot-dash-lines in FIG. 3, this second set of inclined planes can have, relative to the axial direction X—X, an inclination (c) in the same direction as the inclination of the inclined planes (6, 7), a zero inclination (b), or an inclination (a) in the opposite direction to the inclination of the inclined planes 6, 7.

Between the case 1 of the differential and the output shaft 10, is interposed a viscous-fluid coupling device 11 comprising an outer case 12 fixed to the case of the differential and which defines, with the shaft 10, an enclosure 13 filled at least partially with an appropriate viscous fluid such as a silicon oil.

The coupling device comprises, as is well known, two series of alternating disks 14, 15 which are respectively rotationally integral with the case 12 and with the shaft 10.

Furthermore, an axially movable plate 16 is arranged in the case 12 and in contact with the adjacent end of the sleeve 8 which extends sealingly through a wall 17 of the case 12. Between the wall 5 of the differential case, and the wall 17 of the case of the coupling, there are arranged the following control means;

Four flyweights 21, which can move radially and are regularly angularly spaced, are guided between the two opposite faces of the walls 5 and 17. These flyweights are, moreover, guided and made rotationally integral with the case by guide pins 22 accommodated in bores 23. Springs 24, for example leaf springs such as those illustrated in FIG. 2, stress the various flyweights radially inward. Each flyweight defines, in its radial inner part, two inclined planes 25, 26 which are oriented in the same direction but at different angles. The first inclined plane 25, directed toward the coupling device, interacts with a shuttle 27 accommodated in an orifice 28 pierced in the wall 17. This shuttle, when activated, has the effect of modifying the volume of the enclosure 13, and consequently the internal pressure in this enclosure.

The inclined plane 26 of each flyweight, directed toward the differential, serves as a bearing for a disk 29 which itself serves as a stop for the sleeve 5. The contact surfaces 29$^a$ between the sleeve and the disk are preferably frustoconical surfaces. A return spring 30, tending to space apart the disk and the flyweight, is interposed between these two components.

Such a device operates as follows: when a relative speed is generated between the differential case 1 and the output shaft 10, the viscous-fluid coupling comes into play in order to control and limit this difference in speed. Below a specified rotational speed of the case 1, the control mechanism occupies the position illustrated in the drawing, in other words the flyweights 21 are in their position closest to the axis X—X, and prevent the axial displacement of the sleeve 5, via the disk 28.

As soon as a certain rotational speed of the case is reached, specified by the calibration of the springs 24, the flyweights 21 are displaced radially outward, and the action of the inclined plane 25 on the shuttle 27 has the effect of modifying the operating characteristic of the viscous-fluid coupling. This outward radial displacement of the flyweights also has the effect of permitting an axial displacement of the disk 29, with the result that, under the effect of the torque transmitted by the sun gear 2 to the sleeve 5, the latter is caused to be displaced axially and to act on the plate 16. The displacement of this plate modifies the spacing between the disks of the coupling device and consequently additionally modifies the operating characteristic of the latter.

It can therefore be seen that the device according to the invention enables both the rotational speed of the differential case and a torque transmitted by this differential to be taken into consideration in order to modify the operating characteristic of the viscous coupler. These two parameters are taken into consideration in a specified order, in other words firstly the speed and secondly the torque, which seems to be the most advantageous in the application in question.

Figure 4:
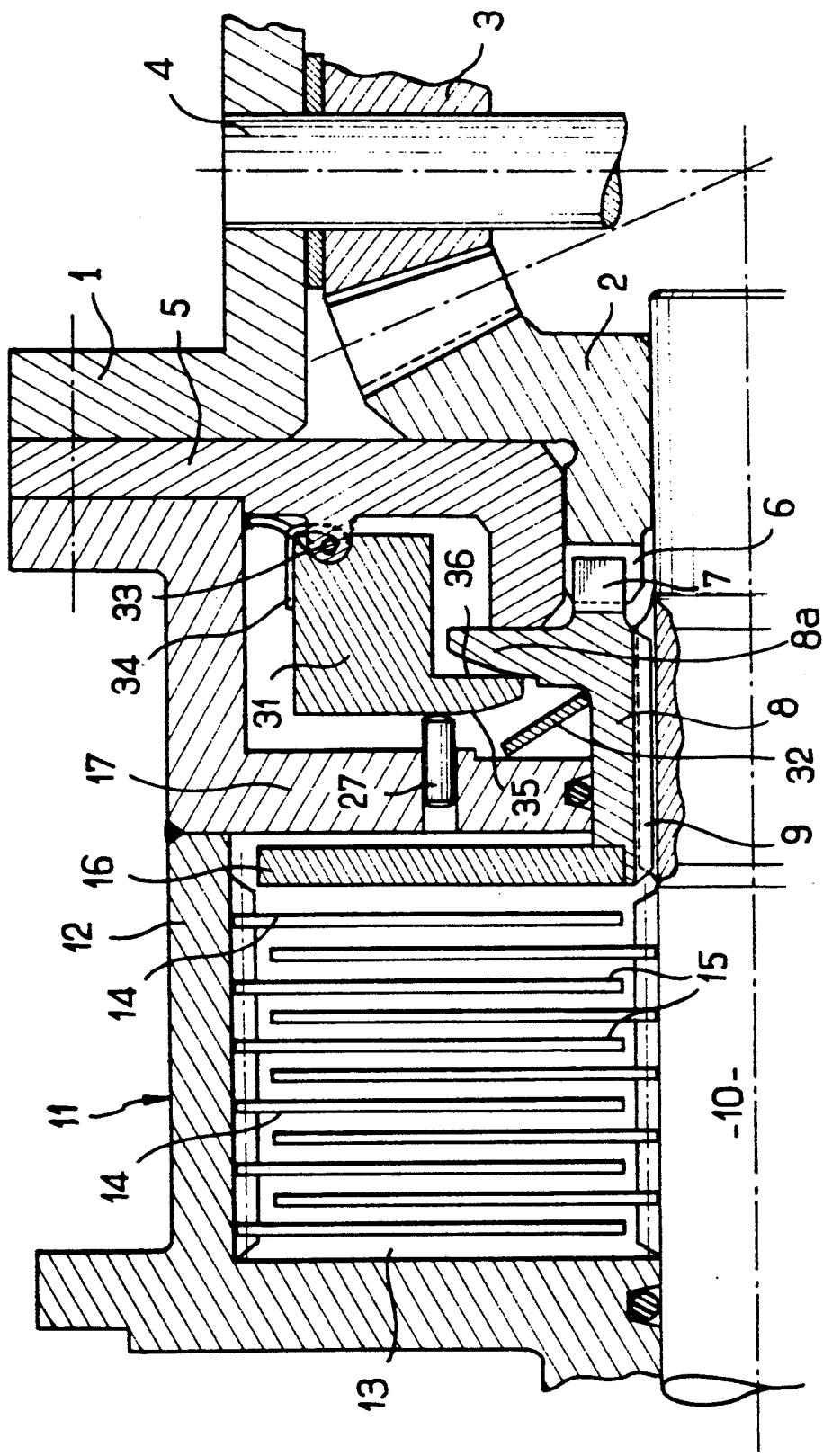
FIG. 4 is a partial sectional view of an alternative embodiment.

In the embodiment illustrated in FIG. 4, the elements corresponding to those in FIG. 1 are designated by the same reference numerals.

In this alternative embodiment, the sleeve 8 comprises a radial flange 8$^a$, one plane face of which bears against a part of the wall 5, whilst its other curved face bears against the flyweights 31. A return spring, consisting of a Belleville washer 32, stresses this sleeve toward the sun gear 2. Each flyweight is articulated about a pin 33 on the wall 5 of the differential case instead of being mounted so as to slide. It is returned by a hairpin spring 34. Each flyweight is in contact via an inclined plane 35 with at least one shuttle 27 and serves as a stop at 36 for the sleeve 8.

The operation of this device differs little from that described with regard to FIG. 1. Indeed, below a specified rotational speed of the differential case, the flyweights 31 are in the lower position, and the sleeve 8 is held in the position illustrated in the drawing. The torque transmitted by the sun gear 2 has no effect on the axial position of the sleeve which abuts the flyweights.

The flyweights are stressed outward only above a specified rotational speed of this case, and they begin to pivot about their articulation pins 33. In so doing, they cause the shuttles 27 to be displaced toward the coupling device, thus modifying the characteristic of the latter.

The outward displacement of the flyweights 31 also has the effect of releasing the sleeve 8 which can then, under the effect of the resultant force of the torque exerted in the region of the inclined planes 6 and 7, be displaced to the left and push back the plate 16. This displacement has the effect of modifying the spacing between the disks of the coupling, and consequently of modifying the operating characteristic of the coupling.

In both the above-described embodiments, the device according to the invention was used to control the operation of a differential.

In the two following embodiments, this device is used as a viscous transmitter, between two members 41, 42 such as two sections of a longitudinal transmission shaft. The member 41 is fixed to a case 43 which constitutes one of the two elements of a viscous-fluid coupling device 44. This case is completed by an end cover 45 and two radial partitions 46 and 47. A shaft 50, connected for example by a flange to the other section 42 of the transmission, is supported rotatably via rolling bearings 48 and 49 in this case. The internal element of the coupling device is a hollow shaft 51 with external splines at 52, which is mounted so as to be able to rotate freely relative to the case 43 and relative to the internal shaft 50. Within the enclosure defined by the case 43, the wall 46 and the hollow shaft 51 there are arranged two series of alternating disks 53, 54, respectively rotationally integral with the case and with the hollow shaft. The latter is made rotationally integral via splines 55 with a sleeve 56 which is mounted so as to slide and which is connected via inclined planes 57, 58 to a ring 59 which is itself connected via splines 60 to the shaft 50. The sliding sleeve 56 passes sealingly through the wall 46 of the case and bears against a plate 61 which is capable of being displaced axially in order to modify the spacing between the disks 53 and 54.

Figure 2:
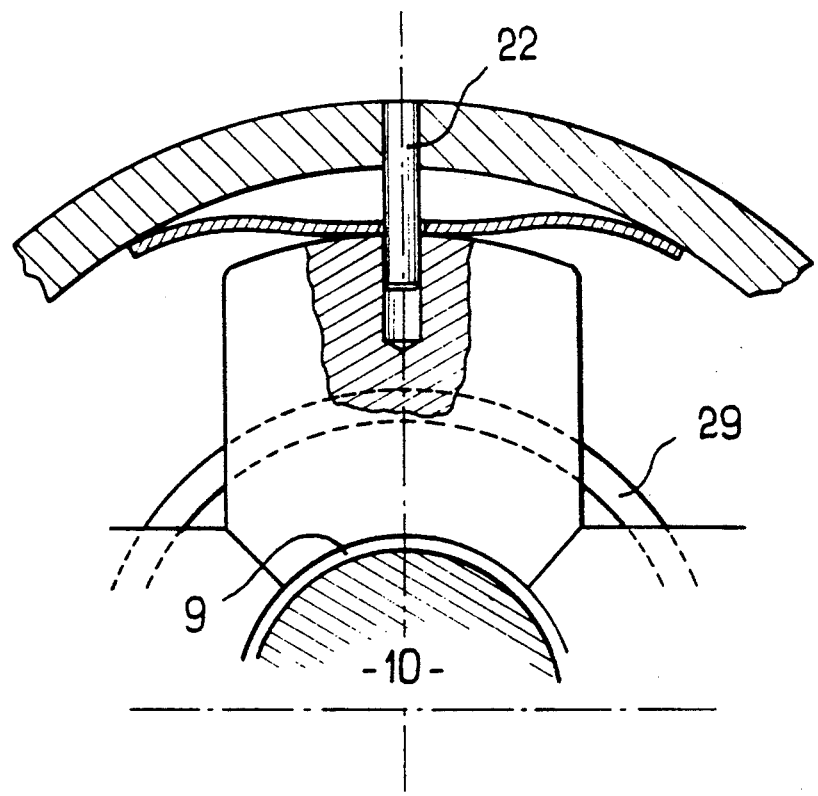
FIG. 2 is a sectional view along the line 2—2 in FIG. 1.

The device is completed by an assembly such as that already described with regard to the preceding FIGS. 1 and 2 and which comprises four flyweights 62 mounted so as to slide radially between the two walls 46 and 47 and guided relative to the case by centering pins 63. These flyweights are stressed radially inward by leaf springs 64. They act on shuttles 65 mounted so as to slide in orifices of the wall 46 and serve as stops for a disk 66 on which bears an inclined portion of the sleeve 56. This disk, and consequently the sleeve, are stressed to the right when viewing FIG. 4 by a return spring 67.

If it is assumed that the member 41 constitutes a driving member, the device operates as follows:

The case 43 is driven in rotation and drives the hollow shaft 51 via the viscous-fluid coupling device 44. This shaft 51 itself drives the shaft 50 and the output member via the sleeve 56 and via the ring 59. As long as the case is rotating at a speed less than a predetermined value, the flyweights and the sleeve 56 maintain the position illustrated in the drawing and do not modify the operating characteristic of the viscous-fluid coupling. The flyweights 62 are stressed radially outward by the centrifugal force only after the case 43 has reached a specified rotational speed, and they act on the shuttles 65 in order to modify the operating characteristic of the coupling. In so doing, the flyweights also release the sleeve 56 which, under the action of the torque which is exerted in the region of the inclined planes 57 and 58, is displaced axially in order to push back the plate 61 in opposition to the spring 30, and to reduce the spacing between the disks of the coupling device.

It should be noted that, in such an arrangement, the shaft 50 can also be used as an input member, the case 43 then becoming an output member. In this second case, it is the speed of the output member which specifies the change in characteristic of the coupling device.

Figure 5:
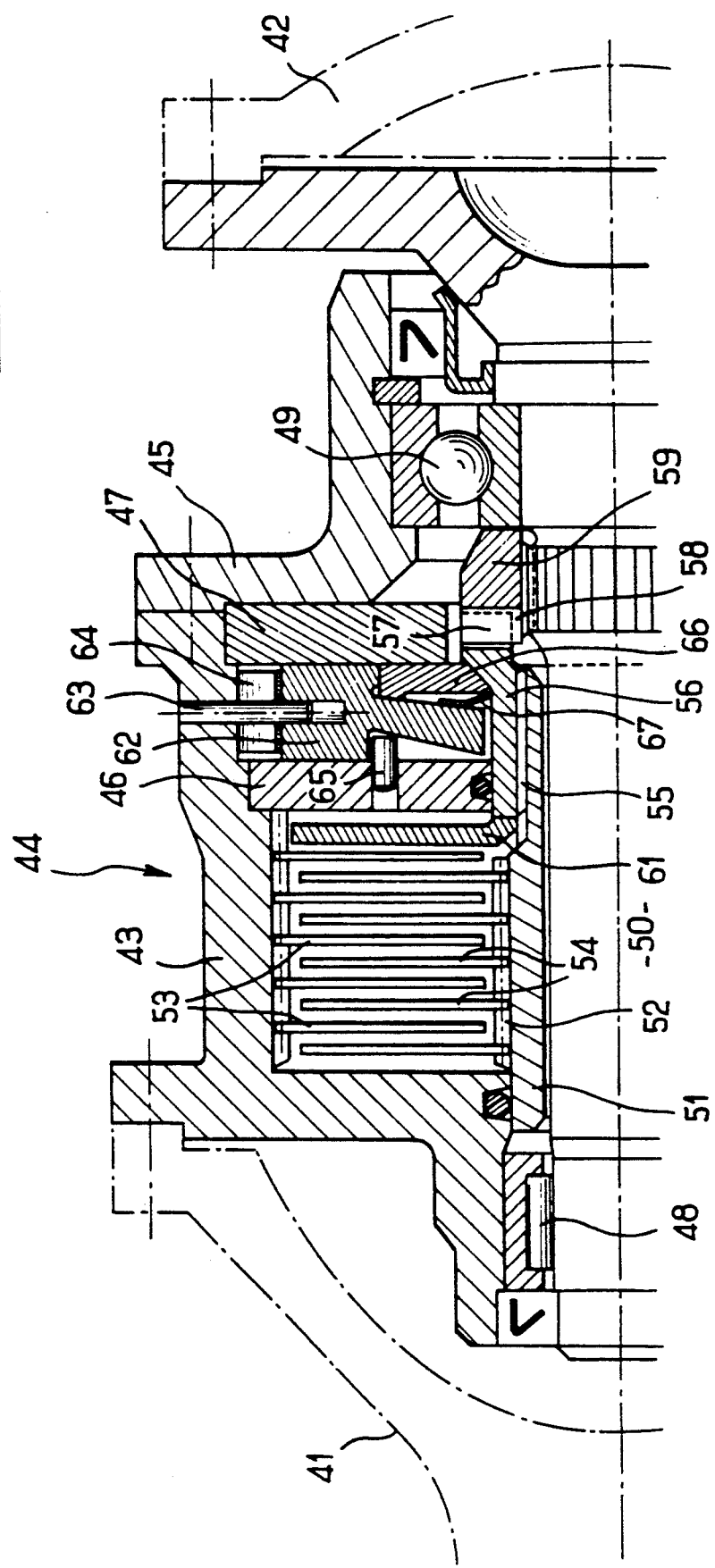
FIGS. 5 and 6 are two views in longitudinal section of two other alternative embodiments.
Figure 6:
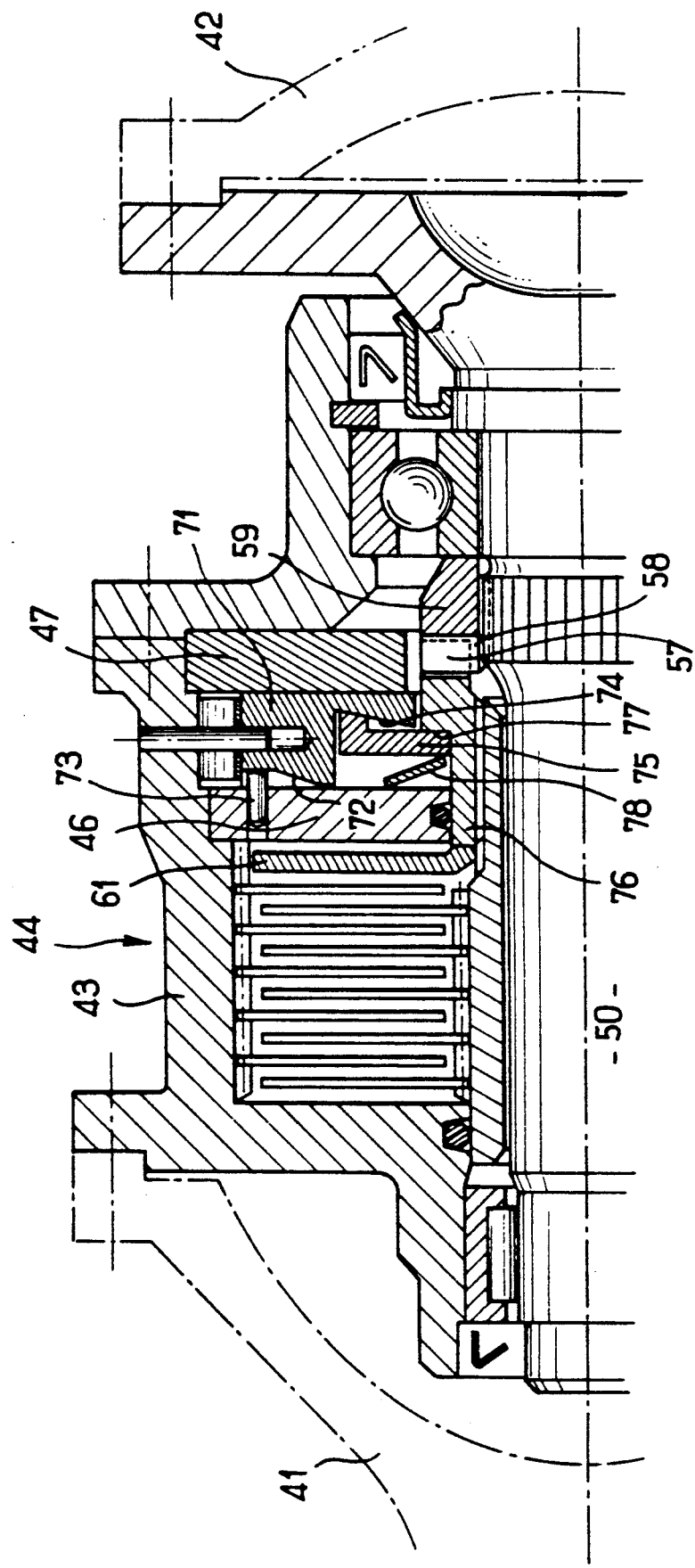

In the alternative embodiment in FIG. 5, the elements corresponding to those in FIG. 4 are designated by the same reference numerals.

The device has been adapted so that the operating characteristic of the viscous-fluid coupling is modified firstly as a function of the torque, the variation as a function of the speed of one of the elements only coming into play secondly.

To this end, each flyweight 71 comprises two inclined planes, a first inclined plane 72 situated in its outer radial portion and intended to interact with the shuttle 73, and a second inclined plane 74 arranged radially further inward and which is in contact with the disk 75. In this case, the disk is placed axially between the inclined plane 74 of the flyweight, and the wall 47 defining the coupling device. The sleeve 76 bears via a radial shoulder 77 against the disk 75, the latter being returned to the right, when viewing the drawing, by a Belleville washer 78.

With such an arrangement, in the position illustrated in the drawing, the flyweights 71 are locked in the radial inward position by the disk 75 which serves as a stop. When the torque transmitted in the region of the inclined planes 57 and 58 becomes sufficient, the sleeve 76 is displaced to the left when viewing FIG. 5, which has the effect, on the one hand, of displacing the plate 61 and, on the other hand, of displacing the disk 75 to the left, in opposition to the action of the spring 78. The flyweights are then released and can act on the shuttles 73 in order to modify also the operating characteristic of the fluid coupling.

Inclined planes such as those illustrated in FIG. 3 can, of course, be provided in the various alternative embodiments envisaged whilst remaining within the scope of the invention.

Furthermore, two devices such as those described with regard to FIGS. 4 and 5 can be combined in order, for example, to replace a conventional axle differential.

In this case, it is sufficient to provide a double case, integral with a gear wheel constituting an input member, this double case being shared by two couplings, and the rest of the device conforming with that illustrated in FIGS. 4 and 5. The output members of the two devices are then connected by conventional means to one of the wheels of the vehicle respectively.

I claim:

1. A transmission device between two coaxial rotating members, comprising a viscous-fluid coupling with a driving element and a driven element, and control means for modifying the operating characteristic of said coupling, said control means incorporated into the device and acting as a function of the rotational speed of one of said members and as a function of a torque transmitted by the device and said control means including a member mounted so as to slide axially and connected to one of the two rotating members by at least one set of inclined planes, said sliding member being capable of moving axially as a function of the torque which is exerted in the region of the inclined planes and thereby modifying the operating characteristic of the coupling device.

2. The device as claimed in claim 1, wherein the modification of the operating characteristic of the coupling takes place firstly as a function of said rotational speed.

3. The device as claimed in claim 1, wherein the modification of the operating characteristic of the coupling takes place firstly as a function of said torque.

4. The device as claimed in claim 1, wherein the speed taken into consideration is that of the driving element of the coupling device.

5. The device as claimed in claim 1, wherein the speed taken into consideration is that of the driven element of the coupling device.

6. The device as claimed in claim 1, further comprising internal means preventing one of the two parameters, speed or torque, from being taken into consideration as long as the other parameter has not reached a predetermined threshold value.

7. The device as claimed in claim 1, wherein the two rotating members are two of the input and output members of a differential, the speed taken into consideration being that of one of these two members, whilst the torque taken into consideration is that which passes between one of said members and the coupling device.

8. The device as claimed in claim 1, wherein said coupling is interposed between two coaxial shaft sections.

9. The device as claimed in claim 1, wherein the control means comprise at least one flyweight which can move under the effect of the centrifugal force and is rotationally integral with one of said rotating members, each flyweight comprising an active surface interacting with a component capable of modifying the operating characteristic of the coupling device.

10. The device as claimed in claim 9, wherein each flyweight acts on a shuttle mounted so as to slide in a pierced hole in an adjacent wall of the coupling device.

11. The device as claimed in claim 9, wherein an elastic member is provided which stresses each flyweight radially inward.

12. The device as claimed in claim 1, wherein said sliding member acts on a member capable of modifying the operating characteristic of the coupling device.

13. The device as claimed in claim 12, wherein at least two sets of inclined planes are provided between the sliding member and the adjacent rotating member, said sets come into play respectively when the device transmits torques in opposite directions, and said sets have different inclination characteristics.

14. The device as claimed in claim 13, wherein the inclined planes of the two sets of inclined planes are inclined in the same direction but at different angles.

15. The device as claimed in claim 13, wherein the inclined planes of one of the sets of inclined planes are parallel to the axis of the device.

16. The device as claimed in claim 13, wherein the sets of inclined planes are inclined in opposite directions and at different angles.

17. The device as claimed in claim 12, wherein the sliding member is a sleeve, a disk is provided, interposed between this sleeve and at least one of the flyweights, said disk bearing against an adjacent surface of the flyweight and serving as a stop to prevent the axial displacement of the sleeve as long as the flyweight has not been displaced radially outward under the effect of the centrifugal force.

18. The device as claimed in claim 17, wherein a spring is interposed between the flyweight and the disk or the adjacent sleeve, tending to space these two elements apart from each other.

19. The device as claimed in claim 1, wherein the coupling device is of the type comprising an internal element and an external element which rotate, are coaxial and define between them an enclosure containing a viscous fluid, each element being rotationally integral with a series of disks, the disks of the two series alternating and being immersed at least partially in the viscous fluid.

20. The device as claimed in claim 19, wherein the external element or case of the coupling device is integral with the case of a differential, whilst the sliding sleeve is connected via inclined planes to one of the sun gears of this differential, and via splines to an output shaft which constitutes the internal element of the coupling device.

21. The device as claimed in claim 9, wherein said at least one flyweight is mounted so as to be able to slide radially.

22. The device as claimed in claim 9, wherein said at least one flyweight is articulated about an articulation pin.

23. The device as claimed in claim 21, wherein said at least one flyweight is rotationally integral with the external element or case or the coupling device.

24. The device as claimed in claim 22, wherein said at least one flyweight is rotationally integral with the external element or case of the coupling device.

25. The device as claimed in claim 12, wherein the sliding sleeve is connected by at least one set of inclined planes to a ring rotationally integral with a shaft which constitutes one of the two rotating members connected by the transmission device.

26. The device as claimed in claim 12, wherein the sliding member comprises a radial projection forming a stop which holds said at least one flyweight in the radial inner position, as long as this sliding member has not been displaced toward the coupling device.

27. The device as claimed in claim 1, wherein it is double and comprises a single input member for the two couplings and two output members which are connected respectively to one of the drive wheels of a vehicle.

* * * * *